(12) United States Patent
Råhlin et al.

(10) Patent No.: US 9,643,117 B2
(45) Date of Patent: May 9, 2017

(54) DUST SEPARATOR USEFUL WITH DRY SCRUBBER SYSTEM

(71) Applicant: ALSTOM Technology Ltd, Baden (CH)

(72) Inventors: Robert Råhlin, Växjö (SE); Ali Mustapha Tabikh, Växjö (SE)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 14/869,113

(22) Filed: Sep. 29, 2015

(65) Prior Publication Data

US 2016/0096130 A1 Apr. 7, 2016

(30) Foreign Application Priority Data

Oct. 3, 2014 (EP) .................................... 14187641

(51) Int. Cl.
*B01D 46/00* (2006.01)
*B01D 53/50* (2006.01)
*B01D 45/16* (2006.01)
*B01D 45/08* (2006.01)
*B01D 45/12* (2006.01)
*B01D 53/10* (2006.01)
*B01D 53/80* (2006.01)
*B01D 53/75* (2006.01)
*B01D 53/78* (2006.01)

(52) U.S. Cl.
CPC ............ *B01D 45/16* (2013.01); *B01D 45/08* (2013.01); *B01D 45/12* (2013.01); *B01D 53/10* (2013.01); *B01D 53/504* (2013.01); *B01D 53/508* (2013.01); *B01D 53/75* (2013.01); *B01D 53/78* (2013.01); *B01D 53/80* (2013.01)

(58) Field of Classification Search
CPC   B01D 46/00; B01D 46/0019; B01D 46/0023; B01D 53/1481; B01D 53/50; B01D 53/501
See application file for complete search history.

(56) References Cited

U.S. PATENT DOCUMENTS 3,250,059 A * 5/1966 Vosseller ............... B01D 46/00
                                                              55/482
4,019,883 A      4/1977 Klomp
8,071,060 B2 * 12/2011 Ukai .................... B01D 53/501
                                                              422/168

(Continued)

FOREIGN PATENT DOCUMENTS

DE          3312978 A1 * 10/1984 ........... B01D 53/501
DE          33 18 880 A2    1/1985
(Continued)

*Primary Examiner* — Timothy Vanoy
(74) *Attorney, Agent, or Firm* — GE Global Patent Operation; Rita D. Vacca

(57) ABSTRACT

An air quality control system (AQCS) 14 useful for treating flue gas FG, such as flue gas FG produced by a fossil fuel fired boiler 12 is described. The AQCS 14 is equipped with a dust separator 37. The dust separator 37 is useful under relatively high dust load conditions downstream from a dry scrubber reactor 36 with limited equipment wear and limited space requirements. As such, the dust separator captures particulate matter with a dust trap that intercepts the flow of particulate matter for collection of the particulate matter in a hopper.

15 Claims, 3 Drawing Sheets

(56) References Cited

U.S. PATENT DOCUMENTS

2003/0024233 A1    2/2003  Snyder
2009/0208397 A1*   8/2009  Levasseur .............. B01D 53/10
                                                     423/244.07

FOREIGN PATENT DOCUMENTS

| DE | 300 999 A7 | 9/1992 |
| DE | 44 15 719 A1 | 11/1995 |
| EP | 0 922 484 A1 | 6/1999 |
| WO | 97/37747 | 10/1977 |
| WO | 9616727 | 6/1996 |
| WO | WO 97/37747 A1 * 10/1997 | ............. B01D 53/81 |

* cited by examiner

DUST SEPARATOR USEFUL WITH DRY SCRUBBER SYSTEM

CROSS-REFERENCE TO RELATED APPLICATIONS

A claim of priority is hereby made for this US patent application to European Patent Convention application number 14187641.7, having a filing date of Oct. 3, 2014, incorporated herein in its entirety by reference.

FIELD OF THE DISCLOSURE

The present disclosure is generally directed to a dust separator useful with a dry scrubber system for processing a relatively high dust load gas stream, such as a flue gas stream produced by a fossil fuel fired boiler, a combustion process, or the like. More particularly, the present disclosure is directed to a dust separator for a dry flue gas desulfurization (DFGD) system useful under relatively high dust load conditions with limited equipment wear and limited space requirements.

BACKGROUND OF THE DISCLOSURE

In treating flue gas, dry flue gas desulfurization (DFGD) systems are known. In DFGD processes, lime (CaO) is first converted to hydrated lime ($Ca(OH)_2$) before being placed in contact with the flue gas to be treated. The hydrated lime is placed in contact with the flue gas as a dry or moistened powder within a circulating dry scrubber (CDS) DFGD system. An example of such a CDS DFGD system is the ALSTOM NID™ system (ALSTOM Power Inc., Paris, France) (NID).

WO 97/37747, invented by Stefan Ahman et al., discloses a device for a CDS DFGD system useful for discharging and distributing an absorbent material in a flue gas duct. Accordingly, in a vertical flue gas duct for flue gases containing gaseous pollutants, a discharging and distributing device is arranged to discharge and distribute a particulate absorbent material reactive with the gaseous pollutants in the flue gas to convert the gaseous pollutants to a separable dust.

While methods and equipment capable of removing both particulate and gaseous pollutants from a flue gas stream exist, there remains a need for improved DFGD methods and equipment that operates under relatively high dust load conditions with limited equipment wear and limited space requirements to efficiently and effectively meet or exceed regulatory flue gas emissions standards.

SUMMARY

The present disclosure provides a dust separator for an ALSTOM NID™ system (NID) dry flue gas desulfurization (DFGD) system or like system operable using a dry or moistened powder reducing agent, such as calcium oxide or calcium hydroxide. The subject relatively high dust load dust separator used with a NID DFGD system or NID like system to treat flue gas for the removal of sulfur dioxide, and like particulate and gaseous pollutants therefrom, is operative with limited equipment wear and limited space requirements for efficiently and effectively meeting or exceeding regulatory flue gas emissions standards. The use of dry or moistened powder calcium oxide or calcium hydroxide is desirable due to lower capital investment requirements and associated operating costs as compared to wet flue gas desulfurization (WFGD) systems or spray dryer absorber (SDA) DFGD systems that operate using an aqueous lime slurry. While the present disclosure is directed to using the subject relatively high dust load dust separator for DFGD using a NID system or NID like system, the teachings of the present disclosure are equally applicable to other flue gas treatment systems including various particulate collection systems, such as a fabric filter (FF) system or an electrostatic precipitator (ESP) for particulate removal. However, for purposes of clarity and simplicity, the present disclosure is directed to an exemplary embodiment of the subject relatively high dust load dust separator used in combination with a DFGD NID system equipped with a reducing agent distribution device useful for distribution of reducing agent in a flue gas during plant operation. This embodiment exemplification is also used in combination with a FF particulate collection device, for treatment of the flue gas to achieve system efficiency and effectiveness that meets or exceeds regulatory flue gas emissions standards, for a relatively low cost.

The subject embodiment comprises a gas duct through which flue gas FG produced by a combustion process within a boiler flows for treatment prior to release to the atmosphere via a stack. Arranged in the gas duct, is an inlet to a NID DFGD system. The NID DFGD system comprises a flue gas dry scrubber reactor and a reducing agent distribution device, fluidly connected to a reducing agent supply and a water supply. The reducing agent supply may be in the form of a tank or other suitable container for reducing agent storage. The water supply may be in the form of a tank, a piped water source, or other suitable source for water storage and/or supply. Fluidly connected downstream to the dry scrubber reactor is a dust separator for removal of particulate matter from the relatively high dust load flue gas flowing from the dry scrubber reactor. As such, particulate matter is removed from the relatively high dust load flue gas with minimal cost and minimal space requirements. Downstream of the subject dust separator is a fluidly connected FF system for additional removal of particulate matter from the flue gas prior to the so produced cleaned flue gas' release to the atmosphere via a stack. As noted above, an ESP may be used in the place of or in addition to a FF system for removal of particulate matter from the flue gas prior to the cleaned flue gas' release to the atmosphere through a stack. Using the subject system equipped with a NID DFGD system that produces a relatively high dust load flue gas, a dust separator and a FF system, dirty flue gas laden with particulate and/or gaseous pollutants, such as for example, $SO_2$, $SO_3$, HCl, HF, fly ash particulates and/or like acidic contaminants, efficiently and effectively meets or exceeds regulatory flue gas emissions standards with limited equipment wear and limited space requirements. Accordingly, flue gas produced through a combustion process enters the subject system through a single inlet for cleaning. As the flue gas passes through the inlet and into the NID dry scrubber reactor, a moistened reducing agent from a reducing agent supply is uniformly dispersed across a horizontal cross section of the NID dry scrubber reactor through which the flue gas flows. The moistened reducing agent reacts with the flue gas' acidic gases, e.g., $SO_2$, HCl, $SO_3$ and/or HF, and the reacted moistened reducing agent is dried by the flue gas to create a dry reacted particulate by-product. The relatively high dust load flue gas carrying combustion particulates and dry reacted particulate by-product, then flows to a fluidly connected dust separator. The dust separator captures combustion particulates and particulate by-product, which is collected in a dust hopper for reuse upon mixing thereof with the moistened reducing agent. From the dust separator, the flue gas flows to a fluidly connected FF system. Remaining particulate matter entrained in the flue gas is captured within the FF system or like particulate removal device. The particulate matter captured by the FF system is collected in fluidly connected hoppers and fed back to the reducing agent supply before again being uniformly distributed within the NID dry scrubber reactor. The "cleaned" flue gas CG leaves the FF system through a fluidly connected gas duct fluidly connected to a stack for cleaned flue gas CG release therethrough to the atmosphere.

Like most traditional FF systems, the present system uses a FF sectioned into multiple integrated components. By having multiple integrated components, an operator may isolate one or more individual integrated components for maintenance while keeping the remaining integrated components in operation. Likewise, one or more individual integrated components may undergo "turn down" during periods of low demand/low load/low gas flow/low contaminant output, so as to limit or avoid needless equipment wear, energy consumption and like operational associated costs. Through use of a dust separator in the subject system to treat a relatively high dust load flue gas, a smaller capacity FF system is required thus reducing both system cost and space requirements.

In summary, the present disclosure provides an air quality control system for treating flue gas produced in a combustion process to produce cleaned flue gas, that comprises a dry scrubber reactor with a distribution device therein for dispersal of a moistened reducing agent in a flue gas flowing therethrough, a dust separator for capture of particulate matter from the flue gas flowing therethrough, and a particulate removal device for capture of particulate matter from the flue gas flowing therethrough to produce a cleaned flue gas for release to the atmosphere through a stack. The dust separator component of the subject system is operative to capture particulate matter flowing around an axis perpendicular to flue gas flow through the dry scrubber reactor. As such, the dust separator captures relatively small particulate matter with a dust trap arranged within the dust separator housing. The dust trap arranged within the dust separator intercepts the flow of relatively small particulate matter of relatively low inertia for collection of the relatively small particulate matter in a hopper. Collection of the relatively small particulate matter in a hopper is accomplished via two parallel chutes forming extended portions of the dust trap arranged for fluid connection thereof with the hopper. Relatively large particulate matter of relatively high inertia flows along the interior surface of the dust separator housing, is intercepted by the dust trap, and is likewise collected in the fluidly connected hopper. Following such particulate matter capture, the flue gas exits the dust separator housing by horizontal flow through a flue gas outlet.

The subject dust separator as disclosed herein is useful in a system for treating flue gas produced in a combustion process to produce cleaned flue gas. The subject dust separator comprises a dust separator housing for capture of particulate matter, fluidly connected to a dry scrubber reactor equipped with a distribution device therein for dispersal of a moistened reducing agent into a flow of flue gas flowing therethrough. As such, the dust separator captures particulate matter from the flue gas flowing around an axis perpendicular to the flue gas flow through the dry scrubber reactor. The dust separator captures relatively large sized particulate matter with relatively high inertia that flows along the interior surface of the dust separator housing by dust trap interception and collection in the fluidly connected hopper. The dust separator likewise captures relatively small sized particulate matter with relatively low inertia from flue gas flowing therethrough with the dust trap arranged at an inner end of an inner wall within the dust separator housing. The dust trap arranged in the dust separator housing intercepts the flow of relatively smaller sized particulate matter with relatively low inertia for collection thereof in a hopper via parallel elongated chute portions arranged in fluid communication with the hopper. Following particulate matter capture within the dust separator, the flue gas exits the dust separator housing by horizontal flow through a flue gas outlet.

Also disclosed herein is a method of using an air quality control system for treating flue gas produced in a combustion process to produce cleaned flue gas. The subject method comprises dispersing a moistened reducing agent into a flue gas flowing through a dry scrubber reactor using a distribution device, capturing particulate matter from the flue gas using a dust separator, and using a particulate removal device to produce cleaned flue gas for release to the atmosphere through a stack. In using this method, the dust separator captures via a dust trap relatively large sized particulate matter with relatively high inertia that flows along the interior surface of the dust separator housing and into the fluidly connected hopper. The dust separator likewise captures relatively small sized particulate matter with relatively low inertia from flue gas flowing therethrough with the dust trap arranged within the dust separator housing. The dust trap arranged in the dust separator housing intercepts the flow of relatively smaller sized particulate matter with relatively low inertia for collection thereof in a hopper via parallel elongated chute portions arranged in fluid communication with the hopper. Following particulate matter capture within the dust separator, the flue gas exits the dust separator housing by horizontal flow through a flue gas outlet.

Additional features of the present system equipped with a dust separator will be apparent from the following description from which the subject exemplary embodiment is set forth in detail in conjunction with the accompanying drawings.

BRIEF DESCRIPTION OF THE DRAWINGS

The subject air quality control system with dust separator is disclosed in more detail below with reference to the appended drawings wherein.

DETAILED DESCRIPTION

Figure 1:
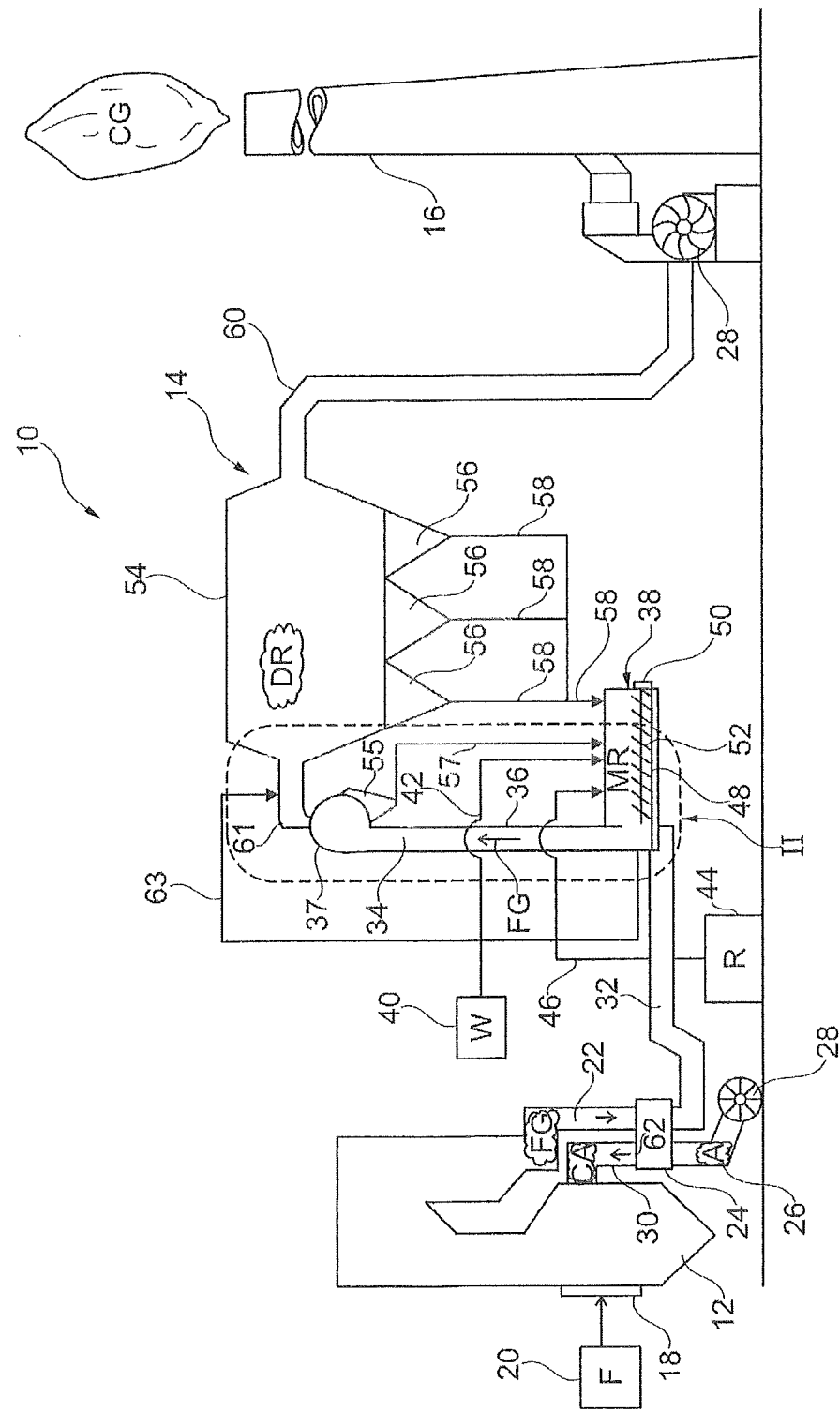
FIG. 1 is a schematic view of a plant with an air quality control system for cleaning flue gas from a combustion process.

A plant 10 in accordance with the subject disclosure best illustrated in FIG. 1, includes a boiler 12, an air quality control system (AQCS) or system 14 and a stack 16. It is noted that many additional and varied process steps using additional equipment may take place or be positioned between boiler 12 and AQCS 14, as is known to those skilled in the art. Likewise, many additional and varied process steps using additional equipment may take place or be positioned between AQCS 14 and stack 16, as is known to those skilled in the art. Such additional process steps and/or equipment are not described in further detail herein for purposes of clarity and simplicity.

As noted above, FIG. 1 illustrates schematically a plant 10 with an AQCS 14 for cleaning dirty flue gas, FG, produced by a boiler 12 operative for fuel F combustion therein. As such, fuel F is supplied to boiler 12 through fuel inlet 18 from a fluidly connected fuel source 20. Fuel F may be a coal, natural gas, or another like fossil fuel. Hot flue gas produced by the combustion of fuel F in boiler 12 contains $SO_2$, $SO_3$, HCl, HF, fly ash particulates and/or like acidic pollutants and/or particulates. The hot flue gas flows from boiler 12 through a fluidly connected gas duct 22 fluidly connected to an air preheater 24. Air preheater 24 is used to transfer heat from the hot flue gas FG to air A supplied through a fluidly connected duct 26 from a fluidly connected fan 28. Air A supplied to the air preheater 24 is heated by the hot flue gas FG prior to flow from the air preheater 24 through a fluidly connected duct 30 and into the fluidly connected boiler 12 as combustion air CA. Optionally, a portion of combustion air CA produced by the air preheater 24 may be diverted and used for purposes other than combustion according to plant 10 needs. Likewise, one or more fans 28 may be used in the plant 10 for transport of flue gas from the boiler 12 through to stack 16.

From air preheater 24, flue gas FG flows to a fluidly connected gas duct 32. Gas duct 32 has a vertical portion 34 comprising a dry scrubber reactor 36. In dry scrubber reactor 36 within vertical portion 34 is a distribution device 38. Distribution device 38 introduces, in a manner such as that disclosed in WO 96/16727, a moistened reducing agent such as calcium oxide and/or calcium hydroxide into the flue gas FG flowing through dry scrubber reactor 36. For this purpose, water W from a water supply 40 flows through a fluidly connected pipe 42 to fluidly connected container 48 of distribution device 38. Likewise, reducing agent R from a reducing agent supply 44 is supplied through a fluidly connected duct 46 to fluidly connected container 48 of distribution device 38.

Distribution device 38 comprises a container 48 essentially in the shape of an elongated box. Container 48 comprises a motor 50 and a mixer 52 for mixing together water W and reducing agent R supplied thereto from water supply 40 and reducing agent supply 44 to produce moistened reducing agent MR having a water content of approximately 1 percent to approximately 6 percent, or approximately 3 percent. Moistened reducing agent MR is uniformly distributed by the distribution device 38 into the fluidly connected reactor 36 in vertical portion 34 of gas duct 32. As such, moistened reducing agent MR may be continuously or intermittently introduced into dry scrubber reactor 36 for uniform distribution and intermixing contact with the flue gas FG flowing therethrough. After intermixing contact with the flue gas FG, the resultant dry reacted particulate by-product or dry reacted reducing agent DR is entrained by the flue gas FG thereby producing a relatively high dust load flue gas DG. This relatively high dust load flue gas DG flows into a dust separator 37 fluidly connected to the dry scrubber reactor 36.

Figure 2:
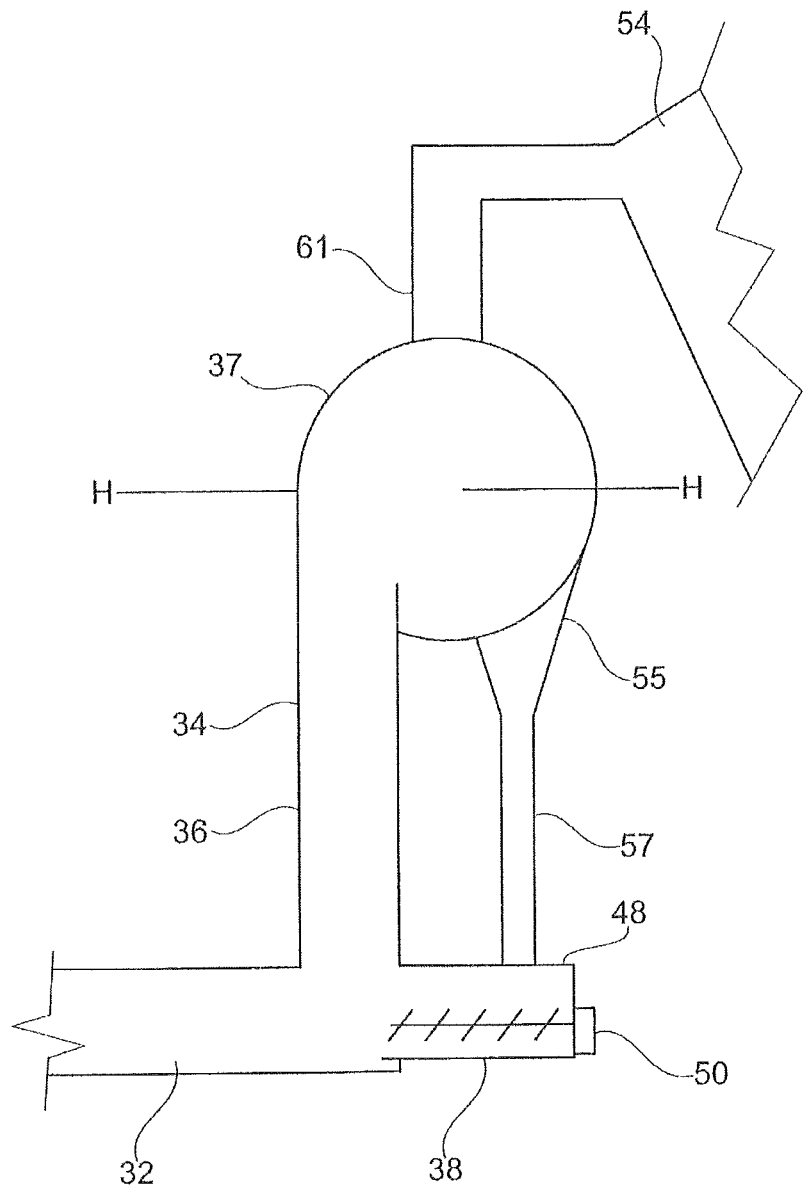
FIG. 2 is an enlarged schematic side view of a portion of the air quality control system in circled area II from FIG. 1.
Figure 3:
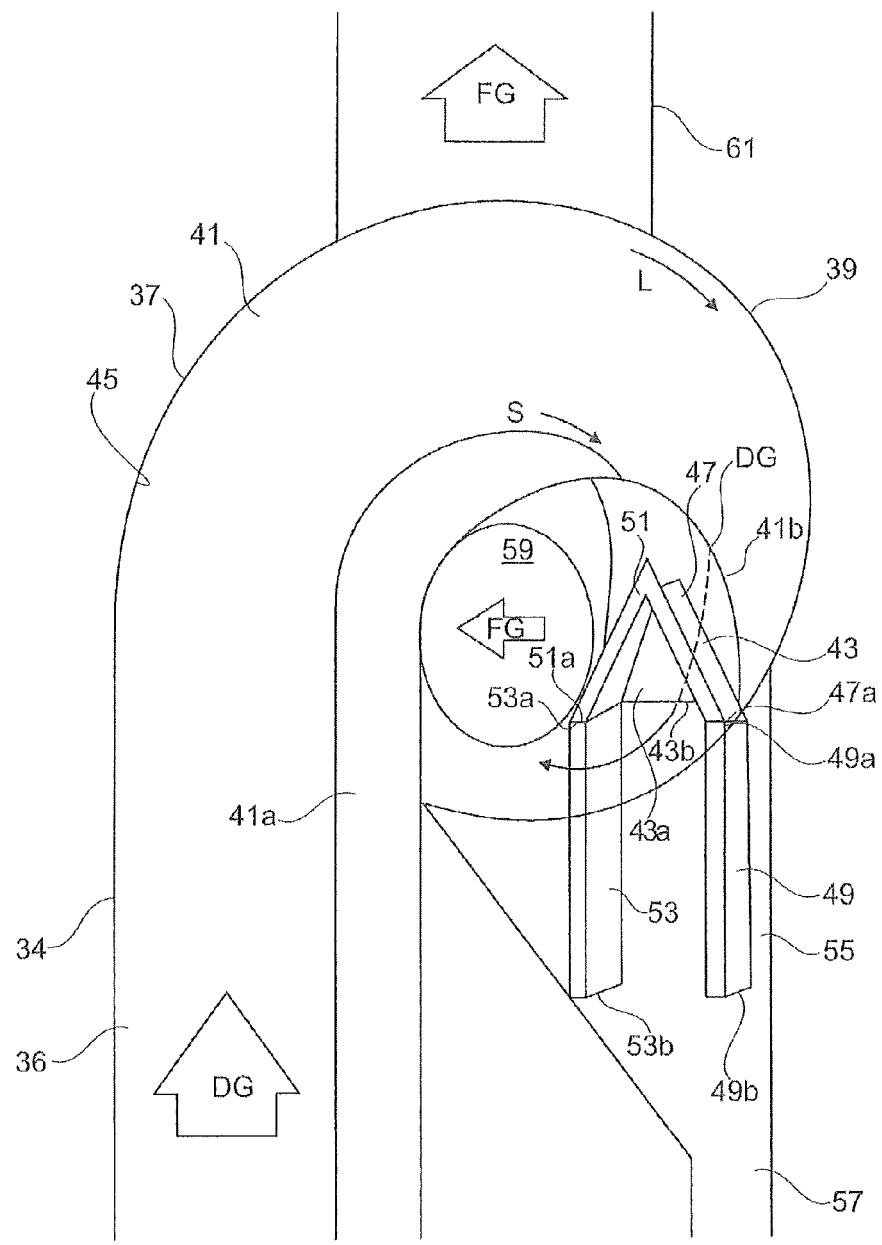
FIG. 3 is an enlarged schematic side perspective cross sectional view of the dust separator in circled area II from FIG. 1.

Dust separator 37 as best illustrated in FIGS. 2 and 3 includes a housing 39 defining an interior area 41 with a dust trap 43 arranged therein to capture particulate matter from a relatively high dust load flue gas DG as it flows in rotation around a horizontal axis H perpendicular to the flow of flue gas FG through vertical dry scrubber reactor 36. As such, high dust load flue gas DG flows from dry scrubber reactor 36 into dust separator 37. The high dust load flue gas DG flows in a curve of approximately 180 degrees within the dust separator 37 interior area 41, following a path between housing 39 interior surface 45 and curved inner wall 41a. Relatively large sized particulate matter of relatively high inertia follows a curved path indicated by arrow L in FIG. 3, near interior surface 45 of housing 39 for interception with and/or flow deviation below dust trap 43 plate 43a edge 43b causing relatively large sized particulate matter of higher inertia to fall and/or flow downwardly into hopper 55 fluidly connected thereto for collection. Hopper 55 is fluidly connected via duct 57 to container 48 of distribution device 38 as described in more detail below. Relatively small sized particulate matter of relatively low inertia follows a curved path indicated by arrow S in FIG. 3, in closer proximity to curved inner wall 41a and axis H than that of the curved path indicated by arrow L in FIG. 3. Relatively small sized particulate matter flowing along the curved path indicated by arrow S is captured by dust trap 43. Dust trap 43 is arranged at an inner end 41b of inner wall 41a within the dust separator 37 housing 39. Dust trap 43 is formed with opposed "L shaped" angled arms 47 and 51. Arms 47 and 51 are integrally formed with or attached perpendicularly to inner end 41b of inner wall 41a forming a triangular plate 43a between opposed "L shaped" angled arms 47 and 51. Opposed "L shaped" angled arms 47 and 51 of dust trap 43 intercept the path of relatively small sized particulate matter for collection thereof. Integrally formed with arms 47 and 51 or connected thereto are parallel chutes 49 and 53, respectively. Fluidly connected at base 47a and base 51a of arms 47 and 51, respectively, adjacent to plate 43a edge 43b, are ends 49a and 53a of chutes 49 and 53, respectively. Collected relatively small sized particulate matter flows downwardly through fluidly connected chutes 49 and 53 and out of opposed ends 49b and 53b of chutes 49 and 53, respectively, into fluidly connected hopper 55. As such, both chute 49 and chute 53 terminate in hopper 55 arranged below housing 39. Hopper 55 is fluidly connected via duct 57 to container 48 of distribution device 38. Particulate matter flowing downwardly through chutes 49 and 53 into hopper 55, or from plate 43a edge 43b into hopper 55, continues its flow from hopper 55 via duct 57 into container 48 of distribution device 38. Within distribution device 38, the collected particulate matter is mixed and moistened along with moistened reducing agent MR therein. Accordingly, within the subject dust separator 37, particulate matter is separated from the relatively high dust load flue gas DG prior to the resultant flue gas FG flowing horizontally out of the dust separator 37 via gas outlet 59 for flow through fluidly connected duct 61.

From duct 61, flue gas FG enters a fluidly connected fabric filter FF system 54. Optionally, depending on regulatory flue gas emissions standards, moistened reducing agent MR may also be continuously or intermittently introduced into duct 61 via duct 63 fluidly connected between duct 61 and distribution device 38, for uniform distribution and intermixing contact with the flue gas FG flowing through duct 61. Particulate matter including any dry reacted reducing agent DR is collected in hoppers 56 of FF system 54 and transported through fluidly connected ducts 58 to fluidly connected container 48 for mixture with the moistened reducing agent MR therein. Alternatively, a portion of dry reacted reducing agent DR collected in hoppers 56 may be transported elsewhere for other purposes. Cleaned flue gas CG exits FF system 54 via fluidly connected duct 60 for release to the atmosphere via fluidly connected stack 16.

In summary, the present disclosure provides an AQCS 14 for treating flue gas FG produced in a combustion process to produce cleaned flue gas CG, that comprises a combustion boiler 12 arranged for flue gas FG flow to a dry flue gas desulfurization or dry scrubber reactor 36 equipped with a distribution device 38. A reducing agent R supply 44 is operable to supply a reducing agent R to the container 48 of distribution device 38 of the dry flue gas desulfurization or dry scrubber reactor 36. A water W supply 40 is operable to supply water W to the container 48 of distribution device 38 for mixing with the reducing agent R therein to produce a moistened reducing agent MR for distribution of the moistened reducing agent MR in the dry scrubber reactor 36. A dust separator 37 is operable to remove dry reacted particulate by-product or dry reacted reducing agent DR and like particulate matter from relatively high dust load flue gas DG flowing therethrough. The relatively high dust load flue gas DG results following contact of the flue gas FG with the moistened reducing agent MR in the dry scrubber reactor 36. From the dust separator 37, flue gas FG flows horizontally through outlet 59 to duct 61 fluidly connected to FF system 54. Following particulate matter capture in FF system 54, resultant cleaned flue gas CG is then released via a stack 16 to the environment or atmosphere.

A method of using air quality control system 14 for treating flue gas FG produced in a combustion process within a boiler 12 to produce cleaned flue gas CG is also disclosed herein. The subject method comprises dispersing a moistened reducing agent MR into flue gas FG flowing through a dry scrubber reactor 36 fluidly connected to boiler 12 using a distribution device 38. The moistened reducing agent MR, preferably calcium oxide or calcium hydroxide due to lower capital investment requirements, reacts with the flue gas' FG acidic gases, e.g., $SO_2$, HCl, $SO_3$ and/or HF. The reacted moistened reducing agent MR is dried by the flue gas FG to produce a dry reacted particulate by-product or dry reacted reducing agent DR. The relatively high dust load flue gas DG carrying combustion particulates, dry reacted particulate by-product or dry reacted reducing agent DR, ash and like particulate matter, referred to throughout the present specification both collectively and individually as "particulate matter" then flows to a fluidly connected dust separator 37. The dust separator 37 captures particulate matter, which is collected in a dust hopper for reuse with the moistened reducing agent MR. The subject dust separator 37 captures particulate matter flowing around a horizontal axis H perpendicular to flue gas FG flow through the dry scrubber reactor 36. The dust separator 37 captures via flue gas FG interception with and/or flow deviation below dust trap 43 plate 43a edge 43b, relatively large sized particulate matter of relatively high inertia following a curved path near interior surface 45 of housing 39, by causing the relatively large sized particulate matter of higher inertia to fall and/or flow downwardly into hopper 55 fluidly connected thereto for collection. Dust separator 37 also captures relatively small sized particulate matter of relatively low inertia following a curved path relatively near inner wall 41a and in closer proximity to horizontal axis H than that of the relatively large sized particulate matter. Relatively small sized particulate matter flowing along the curved path indicated by arrow S is captured by dust trap 43. Dust trap 43 is arranged at an inner end 41b of inner wall 41a within the dust separator 37 housing 39. Dust trap 43 is formed with opposed "L shaped" angled arms 47 and 51. Arms 47 and 51 are integrally formed with or attached perpendicularly to inner end 41b of inner wall 41a forming a triangular plate 43a between opposed "L shaped" angled arms 47 and 51. Opposed "L shaped" angled arms 47 and 51 of dust trap 43 intercept the path of relatively small sized particulate matter for collection thereof. Integrally formed with arms 47 and 51 or connected thereto are parallel chutes 49 and 53, respectively. Fluidly connected at base 47a and base 51a of arms 47 and 51, respectively, adjacent to plate 43a edge 43b, are ends 49a and 53a of chutes 49 and 53, respectively. Collected relatively small sized particulate matter flows downwardly through fluidly connected chutes 49 and 53 and out of opposed ends 49b and 53b of chutes 49 and 53, respectively, into fluidly connected hopper 55. As such, both chute 49 and chute 53 terminate in hopper 55 arranged below housing 39. Hopper 55 is fluidly connected via duct 57 to container 48 of distribution device 38. Particulate matter flowing downwardly through chutes 49 and 53 into hopper 55, or from plate 43a edge 43b into hopper 55, continues its flow from hopper 55 via duct 57 into container 48 of distribution device 38. Following particulate matter capture, the flue gas FG exits the dust separator 37 housing 39 by horizontal flow through a flue gas FG outlet 59. From outlet 59, the flue gas flows through duct 61. Optionally, depending on regulatory flue gas emissions standards, the subject method may likewise include continuously or intermittently introducing moistened reducing agent MR into duct 61 via duct 63 fluidly connected between duct 61 and distribution device 38, for uniform distribution and intermixing contact of moistened reducing agent MR with the flue gas FG flowing through duct 61. Particulate matter entrained in the flue gas flowing from duct 61 into FF system 54 is captured and collected in hoppers 56 of FF system 54 for transport through fluidly connected duct 58 to fluidly connected container 48 for mixture with the moistened reducing agent MR therein. Alternatively, according to the subject method, a portion of the dry reacted reducing agent DR collected in hoppers 56 may be transported elsewhere for other purposes. Cleaned flue gas CG then exits FF system 54 via fluidly connected duct 60 for release to the environment or atmosphere via fluidly connected stack 16.

In summary, the present disclosure provides an air quality control system 14 for treating flue gas FG produced in a combustion process to produce cleaned flue gas CG that comprises a dry scrubber reactor 36 with a distribution device 38 therein for dispersal of a moistened reducing agent MR in a flue gas FG flowing therethrough, a dust separator 37 for capture of particulate matter from relatively high dust load flue gas DG flowing therethrough, and a particulate removal system 54 for capture of particulate matter from the flue gas FG flowing therethrough to produce a treated cleaned flue gas CG for release to the environment or atmosphere through a stack 16. The dust separator 37 component of the subject system 14 captures particulate matter flowing around an axis H perpendicular to flue gas flow through the dry scrubber reactor 36. Dust trap 43 plate 43a edge 43b enables collection of relatively large sized particulate matter of relatively high inertia following a curved path near interior surface 45 of housing 39 in hopper 55 fluidly connected thereto. As such, the dust separator 37 captures via flue gas FG interception with and/or flow deviation below dust trap 43 plate 43a edge 43b, relatively large sized particulate matter of relatively high inertia, by causing the relatively large sized particulate matter of higher inertia to fall and/or flow downwardly into hopper 55 fluidly connected thereto for collection. Dust separator 37 also captures relatively small sized particulate matter of relatively low inertia following a curved path relatively near inner wall 41a and axis H. Relatively small sized particulate matter flowing along the curved path indicated by arrow S is captured by dust trap 43. Dust trap 43 is arranged at an inner end 41b of inner wall 41a within the dust separator 37 housing 39. Dust trap 43 is formed with opposed "L shaped" angled arms 47 and 51. Arms 47 and 51 are integrally formed with or attached perpendicularly to inner end 41*b* of inner wall 41*a* forming a triangular plate 43*a* between opposed "L shaped" angled arms 47 and 51. Opposed "L shaped" angled arms 47 and 51 of dust trap 43 intercept the path of relatively small sized particulate matter for collection thereof. Integrally formed with arms 47 and 51 or connected thereto are parallel chutes 49 and 53, respectively. Fluidly connected at base 47*a* and base 51*a* of arms 47 and 51, respectively, adjacent to plate 43*a* edge 43*b*, are ends 49*a* and 53*a* of chutes 49 and 53, respectively. Collected relatively small sized particulate matter flows downwardly through fluidly connected chutes 49 and 53 and out of opposed ends 49*b* and 53*b* of chutes 49 and 53, respectively, into fluidly connected hopper 55. As such, both chute 49 and chute 53 terminate in hopper 55 arranged below housing 39. Hopper 55 is fluidly connected via duct 57 to container 48 of distribution device 38. Particulate matter flowing downwardly through chutes 49 and 53 into hopper 55, or from plate 43*a* edge 43*b* into hopper 55, continues its flow from hopper 55 via duct 57 into container 48 of distribution device 38. Following particulate matter capture, the flue gas FG exits the dust separator 37 housing 39 by horizontal flow through a flue gas FG outlet 59. From outlet 59, the flue gas flows through duct 61.

The subject dust separator 37 as disclosed herein is useful in treating flue gas FG produced in a combustion process to produce cleaned flue gas CG. The subject dust separator 37 comprises a dust separator 37 housing 39 fluidly connected to a dry scrubber reactor 36 having a distribution device 38 therein for dispersal of a moistened reducing agent MR into a flow of flue gas FG for capture of acidic gases and like pollutants from the flue gas FG. Following dry scrubber reactor 36, the dust separator 37 captures particulate matter from the relatively high dust load flue gas DG flowing from dry scrubber reactor 36. This relatively high dust load flue gas DF flows into dust separator 37 to flow around an axis H perpendicular to flue gas FG flow through the dry scrubber reactor 36. The dust separator 37 captures particulate matter from the relatively high dust load flue gas DG flowing therethrough. Relatively large sized particulate matter of relatively high inertia follows a curved path near interior surface 45 of housing 39 for capture via plate 43*a* edge 43*b* for collection in hopper 55 fluidly connected thereto. As such, the dust separator 37 captures via flue gas FG interception with and/or flow deviation below dust trap 43 plate 43*a* edge 43*b*, relatively large sized particulate matter of relatively high inertia, by causing the relatively large sized particulate matter of higher inertia to fall and/or flow downwardly into hopper 55 fluidly connected thereto for collection. Dust separator 37 also captures relatively small sized particulate matter of relatively low inertia following a curved path relatively near inner wall 41*a* and axis H. Relatively small sized particulate matter flowing along the curved path indicated by arrow S is captured by dust trap 43. Dust trap 43 is arranged at an inner end 41*b* of inner wall 41*a* within the dust separator 37 housing 39. Dust trap 43 is formed with opposed "L shaped" angled arms 47 and 51. Arms 47 and 51 are integrally formed with or attached perpendicularly to inner end 41*b* of inner wall 41*a* forming a triangular plate 43*a* between opposed "L shaped" angled arms 47 and 51. Opposed "L shaped" angled arms 47 and 51 of dust trap 43 intercept the path of relatively small sized particulate matter for collection thereof. Integrally formed with arms 47 and 51 or connected thereto are parallel chutes 49 and 53, respectively. Fluidly connected at base 47*a* and base 51*a* of arms 47 and 51, respectively, adjacent to plate 43*a* edge 43*b*, are ends 49*a* and 53*a* of chutes 49 and 53, respectively. Collected relatively small sized particulate matter flows downwardly through fluidly connected chutes 49 and 53 and out of opposed ends 49*b* and 53*b* of chutes 49 and 53, respectively, into fluidly connected hopper 55. As such, both chute 49 and chute 53 terminate in hopper 55 arranged below housing 39. Hopper 55 is fluidly connected via duct 57 to container 48 of distribution device 38. Particulate matter flowing downwardly through chutes 49 and 53 into hopper 55, or from plate 43*a* edge 43*b* into hopper 55, continues its flow from hopper 55 via duct 57 into container 48 of distribution device 38. Following particulate matter capture, the flue gas FG exits the dust separator 37 housing 39 by horizontal flow through a flue gas FG outlet 59. From outlet 59, the flue gas flows through duct 61.

Also disclosed herein is a method of using an air quality control system 14 for treating flue gas FG produced in a combustion process to produce cleaned flue gas CG. The subject method comprises dispersing a moistened reducing agent MR into flue gas FG flowing through a dry scrubber reactor 36 using a distribution device 38, capturing particulate matter from the flue gas FG using a dust separator 37, and producing treated cleaned flue gas CG for release through a stack 16 by capturing particulate matter from the flue gas FG using a particulate removal system 54. In using this method, the dust separator 37 captures particulate matter flowing around an axis H perpendicular to flue gas FG flow through the dry scrubber reactor 36. The dust separator 37 captures relatively large sized particulate matter of relatively high inertia following a curved path near interior surface 45 of housing 39 via plate 43*a* edge 43*b* for collection in hopper 55 fluidly connected thereto. As such, the dust separator 37 captures via flue gas FG interception with and/or flow deviation below dust trap 43 plate 43*a* edge 43*b*, relatively large sized particulate matter of relatively high inertia, by causing the relatively large sized particulate matter of higher inertia to fall and/or flow downwardly into hopper 55 fluidly connected thereto for collection. Dust separator 37 also captures relatively small sized particulate matter of relatively low inertia following a curved path relatively near inner wall 41*a* and axis H. Relatively small sized particulate matter flowing along the curved path indicated by arrow S is captured by dust trap 43. Dust trap 43 is arranged at an inner end 41*b* of inner wall 41*a* within the dust separator 37 housing 39. Dust trap 43 is formed with opposed "L shaped" angled arms 47 and 51. Arms 47 and 51 are integrally formed with or attached perpendicularly to inner end 41*b* of inner wall 41*a* forming a triangular plate 43*a* between opposed "L shaped" angled arms 47 and 51. Opposed "L shaped" angled arms 47 and 51 of dust trap 43 intercept the path of relatively small sized particulate matter for collection thereof. Integrally formed with arms 47 and 51 or connected thereto are parallel chutes 49 and 53, respectively. Fluidly connected at base 47*a* and base 51*a* of arms 47 and 51, respectively, adjacent to plate 43*a* edge 43*b*, are ends 49*a* and 53*a* of chutes 49 and 53, respectively. Collected relatively small sized particulate matter flows downwardly through fluidly connected chutes 49 and 53 and out of opposed ends 49*b* and 53*b* of chutes 49 and 53, respectively, into fluidly connected hopper 55. As such, both chute 49 and chute 53 terminate in hopper 55 arranged below housing 39. Hopper 55 is fluidly connected via duct 57 to container 48 of distribution device 38. Particulate matter flowing downwardly through chutes 49 and 53 into hopper 55, or from plate 43*a* edge 43*b* into hopper 55, continues its flow from hopper 55 via duct 57 into container 48 of distribution device 38. Following particulate matter capture, the flue gas FG exits the dust separator 37 housing 39 by horizontal flow through a flue gas FG outlet 59. From outlet 59, the flue gas flows through duct 61.

A system and a method of using the subject system have been described herein. The descriptions are intended to be illustrative. It will be apparent to one of skill in the art that modifications may be made to the embodiment and method of using the embodiment as described without departing from the scope of the claims set forth below. For example, it is to be understood that although the system embodiment has been described in the context of an AQCS of a particular arrangement, it should be appreciated that other arrangements may be used without deviation from the spirit and scope of the claims below.

The invention claimed is:

1. An air quality control system for treating flue gas produced in a combustion process to produce cleaned flue gas comprising:
    a dry scrubber reactor with a distribution device therein for dispersal of a moistened reducing agent in a flue gas flowing through the dry scrubber reactor;
    a dust separator comprising a dust separator housing with a dust trap connected to the dry scrubber reactor for capture of flue gas particulate matter flowing through the dust separator housing, with relatively small sized particulate matter intercepted by opposed angled arms of the dust trap and relatively large sized particulate matter intercepted by a plate of the dust trap; and
    a particulate removal device connected to the dust separator for capture of particulate matter from the flue gas flowing through the particulate removal device to produce a treated flue gas for release through a stack.

2. The system of claim 1, wherein the dust separator captures particulate matter flowing around an axis perpendicular to flue gas flow through the dry scrubber reactor creating inertia wherein the relatively small sized particulate matter of relatively low inertia flow along a curved inner wall of the dust separator housing and the relatively large sized particulate matter of relatively high inertia flow along an interior surface of dust separator housing.

3. The system of claim 1, wherein the dust separator captures particulate matter with the dust trap arranged within the dust separator housing by capturing relatively small sized particulate matter with the opposed angled arms of the dust trap for flow through connected chutes into a hopper and by capturing relatively large sized particulate matter with the plate of the dust trap for flow from the plate or beneath the plate into the hopper.

4. The system of claim 1, wherein the dust separator captures particulate matter with the dust trap intercepting the particulate matter for collection of the particulate matter in a hopper prior to particulate matter flow into the distribution device.

5. The system of claim 1, wherein flue gas exits the dust separator housing by horizontal flow through a flue gas outlet.

6. A dust separator for use in treating flue gas produced in a combustion process to produce cleaned flue gas comprising:
    a dust separator housing with a dust trap, fluidly connected to a dry scrubber reactor comprising a distribution device for dispersal of a moistened reducing agent from the distribution device into the flue gas flowing through the dry scrubber reactor, for dust separator capture of particulate matter from the flue gas flowing from the dry scrubber reactor through the dust separator housing, with relatively small sized particulate matter intercepted by opposed angled arms of the dust trap and relatively large sized particulate matter intercepted by a plate of the dust trap.

7. The dust separator of claim 6, wherein the dust separator housing captures particulate matter flowing around an axis perpendicular to flue gas flow through the dry scrubber reactor creating inertia wherein the relatively small sized particulate matter of relatively low inertia flow along a curved inner wall of the dust separator housing and the relatively large sized particulate matter of relatively high inertia flow along an interior surface of dust separator housing.

8. The dust separator of claim 6, wherein the dust separator housing captures particulate matter with the dust trap arranged within an interior area of the dust separator housing by capturing relatively small sized particulate matter with the opposed angled arms of the dust trap for flow through connected chutes into a hopper and by capturing relatively large sized particulate matter with the plate of the dust trap for flow from the plate or beneath the plate into the hopper.

9. The dust separator of claim 6, wherein the dust separator housing captures particulate matter flowing through the dust separator housing with the dust trap intercepting the particulate matter for collection of the particulate matter in a hopper prior to particulate matter flow into the distribution device.

10. The dust separator of claim 6, wherein flue gas exits the dust separator housing by horizontal flow through a flue gas outlet.

11. A method of using an air quality control system for treating flue gas produced in a combustion process to produce cleaned flue gas comprising:
    dispersing using a distribution device a moistened reducing agent into a flue gas flowing through a dry scrubber reactor;
    capturing particulate matter from the flue gas using a dust separator connected to the dry scrubber reactor, the dust separator comprising a dust separator housing and a dust trap for relatively small sized particulate matter interception by opposed angled arms of the dust trap and relatively large sized particulate matter interception by a plate of the dust trap; and
    producing treated flue gas for release through a stack by capturing particulate matter from the flue gas using a particulate removal device connected to the dust separator.

12. The method of claim 11, wherein the dust separator captures particulate matter flowing around an axis perpendicular to flue gas flow through the dry scrubber reactor creating inertia wherein the relatively small sized particulate matter of relatively low inertia flow along a curved inner wall of the dust separator housing and the relatively large sized particulate matter of relatively high inertia flow along an interior surface of the dust separator housing.

13. The method of claim 11, wherein the dust separator captures particulate matter with the dust trap arranged within an interior area of the dust separator housing by capturing relatively small sized particulate matter with the opposed angled arms of the dust trap for flow through connected chutes into a hopper and by capturing relatively large sized particulate matter with the plate of the dust trap for flow from the plate or beneath the plate into the hopper.

14. The method of claim 11, wherein the dust separator captures particulate matter with the dust trap intercepting the particulate matter for collection of the particulate matter in a hopper prior to particulate matter flow into the distribution device.

15. The method of claim 11, wherein flue gas exits the dust separator housing by horizontal flow through a flue gas outlet.

\* \* \* \* \*